United States Patent
Chai et al.

(10) Patent No.: US 11,286,314 B2
(45) Date of Patent: Mar. 29, 2022

(54) METHOD FOR PREPARING CONJUGATED DIENE-BASED POLYMER AND METHOD FOR PREPARING GRAFT COPOLYMER INCLUDING THE SAME

(71) Applicant: LG CHEM, LTD., Seoul (KR)

(72) Inventors: Joo Byung Chai, Daejeon (KR); Yu Sung Jung, Daejeon (KR); Jong Beom Kim, Daejeon (KR); Chang Sull Kim, Daejeon (KR); Eun Seon Park, Daejeon (KR); Tae Young Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 274 days.

(21) Appl. No.: 16/623,744

(22) PCT Filed: Apr. 15, 2019

(86) PCT No.: PCT/KR2019/004531
§ 371 (c)(1),
(2) Date: Dec. 17, 2019

(87) PCT Pub. No.: WO2019/221399
PCT Pub. Date: Nov. 21, 2019

(65) Prior Publication Data
US 2020/0216579 A1    Jul. 9, 2020

(30) Foreign Application Priority Data

May 16, 2018   (KR) .................. 10-2018-0055971
Apr. 11, 2019   (KR) .................. 10-2019-0042448

(51) Int. Cl.
*C08F 2/22* (2006.01)
*C08F 220/44* (2006.01)
*C08F 279/04* (2006.01)

(52) U.S. Cl.
CPC .............. *C08F 2/22* (2013.01); *C08F 220/44* (2013.01); *C08F 279/04* (2013.01)

(58) Field of Classification Search
CPC ......... C08F 2/22; C08F 220/44; C08F 279/04
USPC ...................................................... 524/457
See application file for complete search history.

(56) References Cited

U.S. PATENT DOCUMENTS

| | | | |
|---|---|---|---|
| 5,229,457 A | 6/1993 | Kamoshita et al. | |
| 5,847,050 A * | 12/1998 | Toritani | C08L 25/06 525/84 |
| 5,985,993 A | 11/1999 | Lee et al. | |
| 6,656,999 B1 * | 12/2003 | Lee | C08C 1/07 524/502 |
| 6,777,492 B1 | 8/2004 | Nakai et al. | |
| 2003/0040555 A1 | 2/2003 | Sakabe | |
| 2006/0122327 A1 | 6/2006 | Lester | |
| 2014/0094556 A1 | 4/2014 | Ahn et al. | |

FOREIGN PATENT DOCUMENTS

| | | |
|---|---|---|
| CN | 1376171 A | 10/2002 |
| CN | 1760239 A | 4/2006 |
| CN | 102115506 A | 7/2011 |
| EP | 0483832 A2 | 5/1992 |
| EP | 0779302 A1 | 6/1997 |
| EP | 0872518 A1 | 10/1998 |
| EP | 1245584 A1 | 10/2002 |
| JP | H07188329 A | 7/1995 |
| JP | H1180208 A | 3/1999 |
| JP | 2001294765 A | 10/2001 |
| KR | 19990021574 A | 3/1999 |
| KR | 10-1999-0017231 A | 11/1999 |
| KR | 20090108774 A | 10/2009 |
| KR | 20120070932 A | 7/2012 |
| KR | 20130082429 A | 7/2013 |
| KR | 20150033843 A | 4/2015 |
| KR | 20160084733 A | 7/2016 |

OTHER PUBLICATIONS

Korean Office Action; dated Jul. 13, 2020; 5 pages.
European Search Report for 19803989.3; dated Jul. 1, 2020; 6 pages.
Search Report dated Jul. 17, 2019 for PCT Application No. PCT/KR2019/004531.
Chinese Office Action for CN 201980002934; dated Nov. 2, 2021; 5 pages.

* cited by examiner

*Primary Examiner* — Kelechi C Egwim
(74) *Attorney, Agent, or Firm* — Morgan, Lewis & Bockius LLP

(57) ABSTRACT

Provided are a method for preparing a conjugated diene-based polymer and a method for preparing a graft copolymer including the same. The method for preparing a conjugated diene-based polymer includes enlarging a first conjugated diene-based polymer in multiple stages to prepare a second conjugated diene-based polymer, wherein the multi-stage enlargement includes a primary enlargement stage and a secondary enlargement stage, and a weight ratio of acids added in the primary enlargement stage and the secondary enlargement stage is 70:30 to 90:10. A graft copolymer prepared by the above-described method can be used to form a thermoplastic resin molded article excellent in all of plating characteristics, mechanical properties, surface characteristics, colorability, and processability.

10 Claims, No Drawings

METHOD FOR PREPARING CONJUGATED DIENE-BASED POLYMER AND METHOD FOR PREPARING GRAFT COPOLYMER INCLUDING THE SAME

CROSS-REFERENCE TO RELATED APPLICATION

This application is a National Phase of International Application No. PCT/KR2019/004531, filed on Apr. 15, 2019, which claims priority to and the benefit of Korean Patent Application No. 10-2018-0055971, filed on May 16, 2018, and Korean Patent Application No. 10-2019-0042448, filed on Apr. 11, 2019, the disclosures of which are incorporated herein by reference in their entirety.

TECHNICAL FIELD

The present invention relates to a method for preparing a conjugated diene-based polymer and a method for preparing a graft copolymer including the same, and specifically, to a method for preparing a conjugated diene-based polymer that includes enlarging a conjugated diene-based polymer in multiple stages while dividedly adding acids in a particular ratio and a method for preparing a graft copolymer including the same.

BACKGROUND ART

Generally, acrylonitrile-butadiene-styrene (ABS) graft copolymers prepared through emulsion polymerization may be largely classified into common resin compositions, flame-retardant resin compositions, extrusion resin compositions, heat-resistant resin compositions, transparent resin compositions, and the like according to the characteristics of a matrix copolymer used along therewith, and also subdivided into plating materials, coating materials, automotive materials, toy materials, and the like according to the area of application.

A thermoplastic resin composition including such an ABS graft copolymer often requires plating characteristics while basically having excellent impact resistance, excellent processability, and excellent colorability. In order to improve plating characteristics, a method of adjusting the chemical composition of an ABS graft copolymer, the degree of grafting for an ABS graft copolymer, or the gel content, components, or content of a conjugated diene-based polymer has been proposed. Specifically describing the method of adjusting the components or content of a conjugated diene-based polymer, there are a method of increasing the number of anchor holes in etching of a plating by increasing the content of a conjugated diene-based polymer and a method of adding a small-particle-diameter conjugated diene-based polymer in the preparation of an ABS graft copolymer. If a small-particle-diameter conjugated diene-based polymer is added in the preparation of an ABS graft copolymer, plating adhesion may be improved, whereas the low-temperature and room-temperature impact resistance of an ABS graft copolymer may be degraded. Furthermore, the dispersibility of a conjugated diene-based polymer in an ABS graft copolymer is degraded, and thus a plating appearance characteristic may be degraded, and thermal shock resistance may also be degraded when a cycle from low temperature to high temperature is repeated. In addition, since a small-particle-diameter conjugated diene-based polymer increases the viscosity of an ABS graft copolymer, the processability of a thermoplastic resin composition may be degraded. If the degree of grafting for an ABS graft copolymer increases to overcome the above-mentioned problems, the content of free SAN in an ABS graft copolymer is reduced, resulting in degradation of processability.

Accordingly, research is being conducted on improvement of plating characteristics without degradation of processability.

DISCLOSURE

Technical Problem

The present invention is directed to providing a graft copolymer that can be used to form a thermoplastic resin molded article excellent in all of plating characteristics, mechanical properties, surface characteristics, colorability, and processability.

Technical Solution

One aspect of the present invention provides a method for preparing a conjugated diene-based polymer that includes enlarging a first conjugated diene-based polymer in multiple stages to prepare a second conjugated diene-based polymer, wherein the multi-stage enlargement includes a primary enlargement stage and a secondary enlargement stage, and a weight ratio of acids added in the primary enlargement stage and the secondary enlargement stage is 70:30 to 90:10.

Another aspect of the present invention provides a method for preparing a graft copolymer that includes: enlarging a first conjugated diene-based polymer in multiple stages to prepare a second conjugated diene-based polymer; and adding the second conjugated diene-based polymer, an aromatic vinyl-based monomer, and a vinyl cyan-based monomer to a reactor and performing polymerization, wherein the multi-stage enlargement includes a primary enlargement stage and a secondary enlargement stage, and a weight ratio of acids added in the primary enlargement stage and the secondary enlargement stage is 70:30 to 90:10.

Advantageous Effects

According to the methods of preparing a conjugated diene-based polymer and a graft copolymer of the present invention, a graft copolymer that can be used to form a thermoplastic resin molded article excellent in all of plating characteristics, mechanical properties, surface characteristics, colorability, and processability can be prepared.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the average particle diameter of a conjugated diene-based polymer may be measured by a dynamic light scattering method, specifically, by using a Nicomp 380 instrument (manufactured by PSS Nicomp). In addition, an average particle diameter mentioned in the specification may refer to an arithmetic average particle diameter in the particle size distribution as measured by a dynamic light scattering method, that is, an average particle diameter in a scattering intensity distribution.

In the present invention, a degree of grafting may be calculated by the following equation after a predetermined amount of a graft copolymer is added to a solvent, dissolved with a vibrator, centrifuged in a centrifugal separator, and then dried to obtain an insoluble substance.

Specifically, a degree of grafting may be calculated by the following equation after a predetermined amount of a graft copolymer is added to acetone, dissolved while stirring for 24 hours, and centrifuged in a centrifugal separator at 20,000 rpm and −20° C. to separate a supernatant and a precipitate, and the precipitate was then dried in a hot air dryer for 12 hours to obtain an insoluble substance.

Degree of grafting(%)=(Weight of grafted copolymer/Weight of conjugated diene-based polymer)×100

Weight of conjugated diene-based polymer: Weight of theoretically added conjugated diene-based polymer (based on solid content)

Weight of grafted copolymer: (Weight of precipitate)− (Weight of conjugated diene-based polymer)

In the present invention, the content (%) of a coagulated solid may be calculated as a ratio with respect to a theoretical total weight of monomers, polymers, and additives (an emulsifier and the like) added during polymerization after a conjugated diene-based polymer or a graft copolymer, which is prepared in the form of latex by emulsion polymerization, is filtered through a wire 100-mesh filter, and a polymer that has not passed through the wire mesh is then dried in a 100° C. hot air dryer for an hour.

1. Method for Preparing Conjugated Diene-Based Polymer

A method for preparing a conjugated diene-based polymer according to an embodiment of the present invention includes enlarging a first conjugated diene-based polymer in multiple stages to prepare a second conjugated diene-based polymer, wherein the multi-stage enlargement includes a primary enlargement stage and a secondary enlargement stage, and a weight ratio of acids added in the primary enlargement stage and the secondary enlargement stage is 70:30 to 90:10.

A weight ratio of the acids added in the primary enlargement stage and the secondary enlargement stage is preferably 70:30 to 80:20. When a weight ratio of the acids added in the primary enlargement stage and the secondary enlargement stage does not satisfy the above-described range, the content of coagulated solid of a second conjugated diene-based polymer and a graft copolymer increases, and thus latex stability is degraded. In addition, the degree of grafting for a graft copolymer prepared using the second conjugated diene-based polymer is degraded, and thus the processability of a thermoplastic resin composition including the graft copolymer is also degraded. Additionally, the plating characteristics, mechanical properties, and appearance characteristics of a thermoplastic resin molded article which is a final product are degraded. Specifically, when a weight ratio of the acids added in the primary enlargement stage and the secondary enlargement stage is below the above-described range, the plating characteristics, mechanical properties, appearance characteristics, and colorability of a thermoplastic resin molded article which is a final product are significantly degraded. In addition, when a weight ratio of the acids added in the primary enlargement stage and the secondary enlargement stage exceeds the above-described range, the plating characteristics, mechanical properties, appearance characteristics, and colorability of a thermoplastic resin molded article which is a final product are significantly degraded.

The acids may be one or more selected from the group consisting of phosphoric acid and acetic acid, with acetic acid being preferred.

The total amount of acids added in the primary enlargement stage and the secondary enlargement stage may be 1.0 to 2.5 parts by weight or 1.2 to 2.3 parts by weight with respect to 100 parts by weight of the first conjugated diene-based polymer, with the range of 1.2 to 2.3 parts by weight being preferred. When the above-described range is satisfied, a second conjugated diene-based polymer having an appropriate average particle diameter and exhibiting excellent stability can be prepared.

The acids added in the primary enlargement stage and the secondary enlargement stage may be in a state of a solution in which the acids are mixed with a solvent. When the acids are added in a state of a solution, they are uniformly dispersed in the conjugated diene-based polymer, and thus the conjugated diene-based polymer can be easily enlarged.

A weight ratio of the acid and the solvent may be 1:99 to 15:85 or 5:95 to 10:90, with the range of 5:95 to 10:90 being preferred. When the above-described range is satisfied, there is no rapid change in the pH of the conjugated diene-based polymer which is the form of latex, and thus the stability failure of the conjugated diene-based polymer in the primary and secondary enlargement stages can be minimized.

The solvent may be water.

Hereinafter, each stage of the method for preparing a graft copolymer according to an embodiment of the present invention will be described in detail.

1) Primary Enlargement Stage

First, a first conjugated diene-based polymer is primarily enlarged while adding acids thereto.

The primary enlargement stage may be a stage of forming initial particles for preparing a second conjugated diene-based polymer.

The first conjugated diene-based polymer may be a rubber polymer prepared by polymerizing, specifically, emulsion-polymerizing a conjugated diene-based monomer, and may be in the form of latex dispersed in a colloidal state in water.

The conjugated diene-based monomer may be one or more selected from the group consisting of 1,3-butadiene, isoprene, chloroprene, and piperylene, with 1,3-butadiene being preferred.

The first conjugated diene-based polymer may have an average particle diameter of 0.05 to 0.15 μm or 0.07 to 0.13 μm, with the range of 0.07 to 0.13 μm being preferred. When the above-described range is satisfied, enlargement is easy, and thus a second conjugated diene-based polymer having an appropriate average particle diameter and exhibiting excellent stability and excellent mechanical properties can be prepared.

In the primary enlargement stage, the acids may be continuously added at a predetermined rate. When the acids are continuously added, there is no rapid change in the pH of the conjugated diene-based polymer, and thus the stability failure of the conjugated diene-based polymer can be minimized.

The continuous addition may be performed for 30 to 60 minutes or 30 to 50 minutes, with the range of 30 to 50 minutes being performed. When the above-described condition is satisfied, there is no rapid change in the pH of the conjugated diene-based polymer, and thus the stability failure of the conjugated diene-based polymer can be minimized.

In addition, the description of the acids added in the primary enlargement stage is the same as described above.

After the primary enlargement stage, a stirring process may be further performed to uniformly disperse the added acids. The stirring process may be performed for 10 to 60 minutes or 10 to 30 minutes, with the range of 10 to 30 minutes being preferred. When the above-described condition is satisfied, the added acids can be sufficiently mixed with the first conjugated diene-based polymer, and the enlargement can be easily performed.

2) Secondary Enlargement Stage

Subsequently, the conjugated diene-based polymer having been primarily enlarged is secondarily enlarged while adding acids thereto to prepare a second conjugated diene-based polymer.

The secondary enlargement stage may be a stage of growing the conjugated diene-based polymer having been primarily enlarged to prepare a second conjugated diene-based polymer having a desired average particle diameter.

In the secondary enlargement stage, the acids may be continuously added at a predetermined rate. When the acids are continuously added, there is no rapid change in the pH of the conjugated diene-based polymer, and thus the stability failure of the conjugated diene-based polymer can be minimized.

The continuous addition may be performed for 30 to 60 minutes or 30 to 50 minutes, with the range of 30 to 50 minutes being performed. When the above-described condition is satisfied, there is no rapid change in the pH of the conjugated diene-based polymer, and thus the stability failure of the conjugated diene-based polymer can be minimized.

In addition, the description of the acids added in the secondary enlargement stage is the same as described above.

The second conjugated diene-based polymer may have an average particle diameter of 0.35 to 0.5 μm or 0.37 to 0.48 μm, with the range of 0.37 to 0.48 μm being preferred. When the above-described range is satisfied, a graft copolymer with excellent mechanical properties and excellent surface gloss characteristics can be prepared.

After the secondary enlargement stage, a stirring process may be further performed to uniformly disperse the added acids. The stirring process may be performed for 10 to 60 minutes or 10 to 30 minutes, with the range of 10 to 30 minutes being preferred. When the above-described condition is satisfied, the added acids can be sufficiently mixed with the conjugated diene-based polymer having been primarily enlarged, and the enlargement can be easily performed.

After the secondary enlargement stage, a process of stabilizing the second conjugated diene-based polymer while adding an emulsifier and a basic substance may be further included.

In the stabilization process, when only an emulsifier is added, the latex stability of the second conjugated diene-based polymer can be enhanced, and when only a basic substance is added, the storage stability of the second conjugated diene-based polymer can be enhanced. However, when both an emulsifier and a basic substance are added, both latex stability and storage stability can be enhanced, and a decrease in pH of the second conjugated diene-based polymer over time can be minimized.

The emulsifier may be an alkali-metal salt of rosin acid, and specifically, potassium rosinate is preferred.

The emulsifier may be added in an amount of 0.1 to 0.5 part by weight or 0.15 to 0.4 part by weight with respect to 100 parts by weight of the first conjugated diene-based polymer, with the range of 0.15 to 0.4 part by weight being preferred. When the above-described range is satisfied, the second conjugated diene-based polymer is stabilized and thus can be easily stored. Furthermore, when a graft copolymer prepared using the second conjugated diene-based polymer is used to form a molded article, the generation of gas caused by the emulsifier can be minimized.

The basic substance may be one or more selected from the group consisting of potassium hydroxide and sodium hydroxide, with potassium hydroxide being preferred.

The basic substance may be added in an amount of 1 to 3 parts by weight or 1.5 to 2.5 parts by weight with respect to 100 parts by weight of the first conjugated diene-based polymer, with the range of 1.5 to 2.5 parts by weight being preferred. When the above-described range is satisfied, the pH of the second conjugated diene-based polymer can be appropriately maintained.

The conjugated diene-based polymer prepared by the method for preparing a conjugated diene-based polymer according to an embodiment of the present invention may include a coagulated solid at 0.08% or less, and preferably at 0.05% or less. When the above-described range is satisfied, the stability of the conjugated diene-based polymer can be improved.

2. Method for Preparing Graft Copolymer

A method for preparing a graft copolymer according to another embodiment of the present invention includes: enlarging a first conjugated diene-based polymer in multiple stages to prepare a second conjugated diene-based polymer; and adding the second conjugated diene-based polymer, an aromatic vinyl-based monomer, and a vinyl cyan-based monomer to a reactor and performing polymerization, wherein the multi-stage enlargement includes a primary enlargement stage and a secondary enlargement stage, and a weight ratio of acids added in the primary enlargement stage and the secondary enlargement stage is 70:30 to 90:10.

The description of the preparation of a second conjugated diene-based polymer is the same as described above in the method for preparing a conjugated diene-based polymer according to an embodiment of the present invention.

The second conjugated diene-based polymer may be added at 50 to 70 wt % or 55 to 65 wt % with respect to the total weight of the second conjugated diene-based polymer, the aromatic vinyl-based monomer, and the vinyl cyan-based monomer, with the range of 55 to 65 wt % being preferred. When the above-described range is satisfied, graft polymerization is easily performed, and thus manufacturing yield can be improved.

The method for preparing a graft copolymer according to another embodiment of the present invention may further include further adding the first conjugated diene-based polymer to the reactor and performing polymerization.

In this case, the first conjugated diene-based polymer and the second conjugated diene-based polymer may be added at 50 to 70 wt % or 55 to 65 wt % with respect to the total weight of the first conjugated diene-based polymer, the second conjugated diene-based polymer, the aromatic vinyl-based monomer, and the vinyl cyan-based monomer, with the range of 55 to 65 wt % being preferred. A weight ratio of the first conjugated diene-based polymer and the second conjugated diene-based polymer may be 10:90 to 40:60 or 15:85 to 35:65, with the range of 15:85 to 35:65 being preferred. When the above-described range is satisfied, the aromatic vinyl-based monomer and the vinyl cyan-based monomer are sufficiently graft-polymerized in the first and second conjugated diene-based polymers, and thus the first and second conjugated diene-based polymers can be swollen. Therefore, a graft copolymer formed by sufficient graft polymerization in the first and second conjugated diene-based polymers is highly compatible with a matrix copolymer including a unit derived from an aromatic vinyl-based monomer and a unit derived from a vinyl cyan-based monomer, and chains of the graft copolymer and the matrix copolymer are entangled with each other in an extrusion process, thereby a thermoplastic resin composition with excellent mechanical properties can be provided.

The first conjugated diene-based polymer and second conjugated diene-based polymer may be in the form of latex dispersed in a colloidal state in water, and may be added first to a reactor before the initiation of emulsion polymerization.

The aromatic vinyl-based monomer may be one or more selected from the group consisting of styrene, α-methylstyrene, α-ethylstyrene, and p-methylstyrene, with styrene being preferred.

The vinyl cyan-based monomer may be one or more selected from the group consisting of acrylonitrile, methacrylonitrile, phenyl acrylonitrile, and α-chloroacrylonitrile, with acrylonitrile being preferred.

The sum of the added aromatic vinyl-based monomer and the added vinyl cyan-based monomer may be 30 to 50 wt % or 35 to 45 wt % with respect to the total weight of the conjugated diene-based polymer, the aromatic vinyl-based monomer, and the vinyl cyan-based monomer which are added in the polymerization, with the range of 35 to 45 wt % being preferred. When the above-described range is satisfied, the chemical resistance, stiffness, impact resistance, processability, and surface glossiness of a graft copolymer can be improved.

A weight ratio of the aromatic vinyl-based monomer and the vinyl cyan-based monomer may be 80:20 to 65:35 or 75:25 to 70:30, with the range of 75:25 to 70:30 being preferred. When the above-described range is satisfied, a polymerization conversion rate increases, and polymerization stability and latex stability can be improved.

The polymerization may be emulsion polymerization, and may be performed in the presence of one or more selected from the group consisting of an emulsifier, an initiator, a redox-based catalyst, a molecular weight controlling agent, and ion-exchanged water.

The emulsifier may be one or more selected from the group consisting of an alkali-metal salt of rosin acid, an alkali-metal salt of a fatty acid, and an alkali-metal salt of a fatty acid dimer, with the alkali-metal salt of a fatty acid dimer being preferred.

The alkali-metal salt of rosin acid may be one or more selected from the group consisting of potassium rosinate and sodium rosinate, with potassium rosinate being preferred.

The alkali-metal salt of a fatty acid may be an alkali-metal salt of a $C_8$ to $C_{20}$ fatty acid, and one or more selected from the group consisting of an alkali-metal salt of capric acid, an alkali-metal salt of lauric acid, an alkali-metal salt of palmitic acid, an alkali-metal salt of stearic acid, an alkali-metal salt of oleic acid, and an alkali-metal salt of linoleic acid are more preferred.

The alkali-metal salt of a fatty acid dimer may be an alkali-metal salt of a $C_8$ to $C_{20}$ fatty acid dimer, and a potassium salt of a $C_8$ to $C_{20}$ fatty acid dimer is preferred, and a potassium salt of an oleic acid dimer is more preferred.

The emulsifier may be added in an amount of 0.1 to 3 parts by weight or 0.5 to 1.5 parts by weight with respect to 100 parts by weight of the sum of the conjugated diene-based polymer, the aromatic vinyl-based monomer, and the vinyl cyan-based monomer which are added in the polymerization, with the range of 0.5 to 1.5 parts by weight being preferred. When the above-described range is satisfied, emulsion polymerization is easily performed, and an amount of the emulsifier remaining in a graft copolymer can be minimized.

The initiator may be one or more selected from the group consisting of a peroxide-based initiator and a sulfate-based initiator.

The peroxide-based initiator may be one or more selected from the group consisting of t-butyl peroxide, cumene hydroperoxide, and diisopropyl benzene peroxide, with t-butyl peroxide being preferred.

The sulfate-based initiator may be one or more selected from the group consisting of potassium persulfate, sodium persulfate, and ammonium sulfate, with potassium persulfate being preferred.

The initiator may be added in an amount of 0.1 to 1 part by weight or 0.2 to 0.5 part by weight with respect to 100 parts by weight of the sum of the conjugated diene-based polymer, the aromatic vinyl-based monomer, and the vinyl cyan-based monomer which are added in the polymerization, with the range of 0.2 to 0.5 part by weight being preferred. When the above-described range is satisfied, emulsion polymerization is easily performed, and an amount of the initiator remaining in a graft copolymer can be minimized.

The redox-based catalyst may be one or more selected from the group consisting of sodium formaldehyde sulfoxylate, sodium ethylenediamine tetraacetate, ferrous sulfate, dextrose, sodium pyrophosphate, anhydrous sodium pyrophosphate, and sodium sulfate, with one or more selected from the group consisting of ferrous sulfate, dextrose, and sodium pyrophosphate being preferred.

The redox-based catalyst may be added in an amount of 0.1 to 1 part by weight or 0.2 to 0.5 part by weight with respect to 100 parts by weight of the sum of the conjugated diene-based polymer, the aromatic vinyl-based monomer, and the vinyl cyan-based monomer which are added in the polymerization, with the range of 0.2 to 0.5 part by weight being preferred. When the above-described range is satisfied, a high polymerization conversion rate can be ensured, and an amount of the redox-based catalyst remaining in a graft copolymer can be minimized.

The molecular weight controlling agent may be one or more selected from the group consisting of t-dodecyl mercaptan, n-dodecyl mercaptan, n-octyl mercaptan, and an α-methylstyrene dimer, with t-dodecyl mercaptan being preferred.

The molecular weight controlling agent may be added in an amount of 0.01 to 0.5 part by weight or 0.05 to 0.4 part by weight with respect to 100 parts by weight of the sum of the conjugated diene-based polymer, the aromatic vinyl-based monomer, and the vinyl cyan-based monomer which are added in the polymerization, with the range of 0.05 to 0.4 part by weight being preferred. When the above-described range is satisfied, the weight-average molecular weight of a shell is appropriately maintained, and thus the mechanical properties and surface characteristics of a graft copolymer can be improved.

One or more selected from the group consisting of the aromatic vinyl-based monomer, the vinyl cyan-based monomer, and the emulsifier may be dividedly added before and after the initiation of polymerization.

In the case of the divided addition after the initiation of polymerization, the aromatic vinyl-based monomer, the vinyl cyan-based monomer, and the emulsifier may be dividedly added 0 to 2 hours or 0 to 1.5 hours after the initiation of polymerization, with the range of 0 to 1.5 hours being preferred. When the divided addition is performed under the above-described condition, impact strength and polymerization stability can be improved.

In the case of the divided addition of the aromatic vinyl-based monomer, the vinyl cyan-based monomer, and the emulsifier after the initiation of polymerization, it is preferable that they are continuously added at a predetermined rate to improve polymerization stability and latex stability.

The aromatic vinyl-based monomer and the vinyl cyan-based monomer may be dividedly added in a weight ratio of 5:95 to 20:80 or 10:90 to 20:80 before and after the initiation of polymerization, with the weight ratio of 10:90 to 20:80 being preferred. When the above-described range is satisfied, polymerization stability and latex stability can be improved.

The emulsifier may be dividedly added in a weight ratio of 50:50 to 10:90 or 50:50 to 20:80 before and after the initiation of polymerization, with the weight ratio of 50:50 to 20:80 being preferred. When the above-described range is satisfied, an appropriate reaction rate can be ensured at the early stage of polymerization, and polymerization stability can be improved throughout polymerization as well as at the early stage of polymerization.

The method for preparing a graft copolymer according to another embodiment of the present invention may further include, after the divided addition is completed, further adding an initiator and a redox-based catalyst and performing aging to improve a polymerization conversion rate.

The initiator may be a peroxide-based initiator, and the types and contents of the peroxide-based initiator and the redox-based catalyst are the same as described above.

A graft copolymer prepared by the method according to another embodiment of the present invention may have a degree of grafting of 40 to 60% or 45 to 55%, with the range of 45 to 55% being preferred. When the above-described range is satisfied, the conjugated diene-based polymer can be more uniformly dispersed in a graft copolymer, and impact strength can be improved.

3. Thermoplastic Resin Composition

A thermoplastic resin composition according to still another embodiment of the present invention includes: a graft copolymer prepared by the method according to another embodiment of the present invention; and a copolymer including a unit derived from an aromatic vinyl-based monomer and a unit derived from a vinyl cyan-based monomer.

The graft copolymer is prepared by the method for preparing a graft copolymer according to another embodiment of the present invention and may impart excellent plating characteristics, excellent mechanical properties, excellent surface gloss characteristics, excellent colorability, and excellent processability to the thermoplastic resin composition.

The copolymer is a matrix copolymer and includes a unit derived from an aromatic vinyl-based monomer and a unit derived from a vinyl cyan-based monomer.

The copolymer may impart excellent mechanical properties, excellent heat resistance, and excellent processability to the thermoplastic resin composition.

The unit derived from an aromatic vinyl-based monomer may be one or more selected from the group consisting of the units derived from styrene, α-methylstyrene, α-ethylstyrene, and p-methylstyrene, with the unit derived from styrene being preferred.

The unit derived from a vinyl cyan-based monomer may be one or more selected from the group consisting of the units derived from acrylonitrile, methacrylonitrile, phenyl acrylonitrile, and α-chloroacrylonitrile, with the unit derived from acrylonitrile being preferred.

The copolymer may include the unit derived from an aromatic vinyl-based monomer and the unit derived from a vinyl cyan-based monomer in a weight ratio of 80:20 to 70:30 or 75:25 to 70:30, with the weight ratio of 75:25 to 70:30 being preferred. When the above-described range is satisfied, a balance among mechanical properties, processability, and heat resistance can be achieved.

The copolymer may be a styrene/acrylonitrile copolymer or an α-methylstyrene/acrylonitrile copolymer.

A weight ratio of the graft copolymer and the copolymer may be 20:80 to 35:65 or 25:75 to 30:70, with the range of 25:75 to 30:70 being preferred. When the above-described range is satisfied, the plating characteristics, colorability, mechanical properties, surface characteristics, and processability of a molded article formed of the thermoplastic resin composition can be improved.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Example 1

Preparation of First Conjugated Diene-Based Polymer 120 parts by weight of ion-exchanged water, 80 parts by weight of 1,3-butadiene, 3.5 parts by weight of a potassium salt of an oleic acid dimer as an emulsifier, 0.2 part by weight of t-dodecyl mercaptan as a molecular weight controlling agent, 0.3 part by weight of $Na_2CO_3$ as an electrolyte, and 0.03 part by weight of t-butyl hydroperoxide as an initiator were added to a nitrogen-substituted polymerization reactor and then sufficiently mixed while stirring. Subsequently, the temperature inside the polymerization reactor was raised to 45° C., then 0.045 part by weight of dextrose, 0.26 part by weight of sodium pyrophosphate, and 0.0005 part by weight of ferrous sulfate were batch-added as redox-based catalysts, and polymerization was performed for 4 hours. Subsequently, while raising the temperature inside the polymerization reactor to 80° C. and continuously adding 20 parts by weight of 1,3-butadiene, 0.5 part by weight of potassium rosinate as an emulsifier, and 0.2 part by weight of potassium persulfate as an initiator to the polymerization reactor at a predetermined rate for 6 hours, polymerization was performed. Subsequently, 0.03 part by weight of t-butyl hydroperoxide as an initiator, and 0.045 part by weight of dextrose, 0.26 part by weight of sodium pyrophosphate, and 0.0005 part by weight of ferrous sulfate as redox-based catalysts were batch-added to the polymerization reactor, and polymerization was performed for 5 hours while maintaining the temperature inside the polymerization reactor at 80° C. and then terminated, thereby obtaining a first butadiene rubber polymer in the form of latex. In this case, the first butadiene rubber polymer had a gel content of 93%, a polymerization conversion rate of 98%, and an average particle diameter of 0.12 µm.

Preparation of Second Conjugated Diene-Based Polymer

An aqueous acetic acid solution (5 wt %) containing 1.4 parts by weight of acetic acid was continuously added to 100 parts by weight of the first butadiene rubber polymer at a predetermined rate for 30 minutes and then stirred for 20 minutes to induce primary enlargement. Subsequently, an aqueous acetic acid solution (5 wt %) containing 0.6 part by weight of acetic acid was continuously added at a predetermined rate for 10 minutes and then stirred for 20 minutes to induce secondary enlargement, and 0.2 part by weight of potassium rosinate and 2.0 parts by weight of potassium hydroxide were added, thereby preparing a second butadiene rubber polymer in the form of latex.

Preparation of Graft Copolymer 100 parts by weight of ion-exchanged water, 15 parts by weight of the first butadiene rubber polymer, 45 parts by weight of the second butadiene rubber polymer, 1.25 parts by weight of acrylonitrile, 3.75 parts by weight of styrene, 0.5 part by weight of a potassium salt of an oleic acid dimer as an emulsifier, 0.1 part by weight of t-dodecyl mercaptan as a molecular weight controlling agent, and 0.1 part by weight of t-butyl hydroperoxide as an initiator were added to a nitrogen-substituted polymerization reactor and then sufficiently mixed while stirring. Subsequently, the temperature inside the polymerization reactor was raised to 45° C., then 0.045 part by weight of dextrose, 0.26 part by weight of sodium pyrophosphate, and 0.0005 part by weight of ferrous sulfate were batch-added as redox-based catalysts, and polymerization was performed for an hour. Subsequently, the temperature inside the polymerization reactor was raised to 70° C., and then 20 parts by weight of ion-exchanged water, 8.75 parts by weight of acrylonitrile, 26.25 parts by weight of styrene, 0.5 part by weight of a potassium salt of an oleic acid dimer as an emulsifier, 0.1 part by weight of t-dodecyl mercaptan and 0.1 part by weight of an α-methylstyrene dimer as molecular weight controlling agents, and 0.15 part by weight of cumene hydroperoxide as an initiator were continuously added at a predetermined rate for 2 hours. Subsequently, the temperature inside the polymerization reactor was raised to 80° C., and then 0.045 part by weight of dextrose, 0.26 part by weight of sodium pyrophosphate, and 0.0005 part by weight of ferrous sulfate as redox-based catalysts, and 0.1 part by weight of cumene hydroperoxide as an initiator were batch-added. Afterward, the reaction was continued for an hour and terminated, thereby obtaining a graft copolymer latex.

Subsequently, magnesium sulfate was added to the graft copolymer latex, and coagulation, aging, washing, dehydration, and drying were performed, thereby preparing a graft copolymer powder.

Example 2

A graft copolymer powder was prepared in the same manner as in Example 1 except that, in the preparation of a second conjugated diene-based polymer, an aqueous acetic acid solution (5 wt %) containing 1.5 parts by weight of acetic acid was added in the first enlargement, and an aqueous acetic acid solution (5 wt %) containing 0.5 part by weight of acetic acid was added in the second enlargement, thereby preparing a second butadiene rubber polymer.

Example 3

A graft copolymer powder was prepared in the same manner as in Example 1 except that, in the preparation of a second conjugated diene-based polymer, an aqueous acetic acid solution (5 wt %) containing 1.6 parts by weight of acetic acid was added in the first enlargement, and an aqueous acetic acid solution (5 wt %) containing 0.4 part by weight of acetic acid was added in the second enlargement, thereby preparing a second butadiene rubber polymer.

Example 4

A graft copolymer powder was prepared in the same manner as in Example 1 except that, in the preparation of a second conjugated diene-based polymer, an aqueous acetic acid solution (5 wt %) containing 1.7 parts by weight of acetic acid was added in the first enlargement, and an aqueous acetic acid solution (5 wt %) containing 0.3 part by weight of acetic acid was added in the second enlargement, thereby preparing a second butadiene rubber polymer.

Example 5

A graft copolymer powder was prepared in the same manner as in Example 1 except that, in the preparation of a second conjugated diene-based polymer, an aqueous acetic acid solution (5 wt %) containing 1.8 parts by weight of acetic acid was added in the first enlargement, and an aqueous acetic acid solution (5 wt %) containing 0.2 part by weight of acetic acid was added in the second enlargement, thereby preparing a second butadiene rubber polymer.

Comparative Example 1

A graft copolymer powder was prepared in the same manner as in Example 1 except that, in the preparation of a second conjugated diene-based polymer, an aqueous acetic acid solution (5 wt %) containing 2 parts by weight of acetic acid was continuously added at a predetermined rate for 30 minutes and then stirred for 20 minutes to induce enlargement, and 0.2 part by weight of potassium rosinate and 2.0 parts by weight of potassium hydroxide were added, thereby preparing an enlarged butadiene rubber polymer.

Comparative Example 2

A graft copolymer powder was prepared in the same manner as in Example 1 except that, in the preparation of a second conjugated diene-based polymer, an aqueous acetic acid solution (5 wt %) containing 1.2 parts by weight of acetic acid was added in the first enlargement, and an aqueous acetic acid solution (5 wt %) containing 0.8 part by weight of acetic acid was added in the second enlargement, thereby preparing a second butadiene rubber polymer.

Comparative Example 3

A graft copolymer powder was prepared in the same manner as in Example 1 except that, in the preparation of a second conjugated diene-based polymer, an aqueous acetic acid solution (5 wt %) containing 1.34 parts by weight of acetic acid was added in the first enlargement, and an aqueous acetic acid solution (5 wt %) containing 0.66 part by weight of acetic acid was added in the second enlargement, thereby preparing a second butadiene rubber polymer.

Comparative Example 4

A graft copolymer powder was prepared in the same manner as in Example 1 except that, in the preparation of a second conjugated diene-based polymer, an aqueous acetic acid solution (5 wt %) containing 1.38 parts by weight of acetic acid was added in the first enlargement, and an aqueous acetic acid solution (5 wt %) containing 0.62 part by weight of acetic acid was added in the second enlargement, thereby preparing a second butadiene rubber polymer.

Comparative Example 5

A graft copolymer powder was prepared in the same manner as in Example 1 except that, in the preparation of a second conjugated diene-based polymer, an aqueous acetic acid solution (5 wt %) containing 1.9 parts by weight of acetic acid was added in the first enlargement, and an aqueous acetic acid solution (5 wt %) containing 0.1 part by weight of acetic acid was added in the second enlargement, thereby preparing a second butadiene rubber polymer.

Comparative Example 6

Preparation of First Conjugated Diene-Based Polymer

A first butadiene rubber polymer was prepared in the same manner as in Example 1.

Preparation of Second Conjugated Diene-Based Polymer

An aqueous acetic acid solution (5 wt %) containing 1.34 parts by weight of acetic acid was continuously added to 45 parts by weight of the first butadiene rubber polymer at a predetermined rate for 30 minutes and then stirred for 20 minutes to induce primary enlargement. Subsequently, 55 parts by weight of the first butadiene rubber polymer was added and stirred for 5 minutes. Then, an aqueous acetic acid solution (5 wt %) containing 0.66 part by weight of acetic acid was continuously added at a predetermined rate for 10 minutes and then stirred for 20 minutes to induce secondary enlargement, and 0.2 part by weight of potassium rosinate and 2.0 parts by weight of potassium hydroxide were added, thereby preparing a second butadiene rubber polymer in the form of latex.

Preparation of Graft Copolymer 100 parts by weight of ion-exchanged water, 15 parts by weight of the first butadiene rubber polymer, 45 parts by weight of the second butadiene rubber polymer, 1.25 parts by weight of acrylonitrile, 3.75 parts by weight of styrene, 0.5 part by weight of a potassium salt of an oleic acid dimer as an emulsifier, 0.1 part by weight of t-dodecyl mercaptan as a molecular weight controlling agent, and 0.1 part by weight of t-butyl hydroperoxide as an initiator were added to a nitrogen-substituted polymerization reactor and then sufficiently mixed while stirring. Subsequently, the temperature inside the polymerization reactor was raised to 45° C., then 0.045 part by weight of dextrose, 0.26 part by weight of sodium pyrophosphate, and 0.0005 part by weight of ferrous sulfate as redox-based catalysts were batch-added, and polymerization was performed for an hour. Subsequently, the temperature inside the polymerization reactor was raised to 70° C., and then 20 parts by weight of ion-exchanged water, 8.75 parts by weight of acrylonitrile, 26.25 parts by weight of styrene, 0.5 part by weight of a potassium salt of an oleic acid dimer as an emulsifier, 0.1 part by weight of t-dodecyl mercaptan and 0.1 part by weight of an α-methylstyrene dimer as molecular weight controlling agents, and 0.15 parts by weight of cumene hydroperoxide as an initiator were continuously added at a predetermined rate for 2 hours. Subsequently, the temperature inside the polymerization reactor was raised to 80° C., and then 0.045 part by weight of dextrose, 0.26 part by weight of sodium pyrophosphate, and 0.0005 part by weight of ferrous sulfate as redox-based catalysts, and 0.1 part by weight of cumene hydroperoxide as an initiator were batch-added. Afterward, the reaction was continued for an hour and terminated, thereby obtaining a graft copolymer latex.

Subsequently, magnesium sulfate was added to the graft copolymer latex, and coagulation, aging, washing, dehydration, and drying were performed, thereby preparing a graft copolymer powder.

Experimental Example 1

The average particle diameter and content of coagulated solid of second conjugated diene-based polymers according to Examples and Comparative Examples were measured, and results thereof are shown in Table 1 and Table 2 below.

(1) Average particle diameter (μm): measured by a dynamic light scattering method using a Nicomp 380 instrument (manufactured by PSS Nicomp).

(2) Content of coagulated solid (%): calculated as a ratio with respect to a theoretical total weight of butadiene monomers and additives (an emulsifier and the like) added during polymerization after the second conjugated diene-based polymer in the form of latex was filtered through a wire 100-mesh filter, and a polymer that did not pass through the wire mesh was then dried in a 100° C. hot air dryer for an hour.

Experimental Example 2

Physical properties of the graft copolymer powders according to Examples and Comparative Examples were measured by the methods described below, and results thereof are shown in Table 1 and Table 2 below.

(3) Polymerization conversion rate (%): calculated by drying 5 g of polymerized latex in a 150° C. hot air dryer for 15 minutes to obtain a solid content only, calculating the total weight of the solid content (excluding the weight of polymerization additives) for the weight of initial latex, and substituting the resultant weight into the following equation.

Polymerization conversion rate(%): {(Weight of solid content)/(Total weight of monomers and first and second conjugated diene-based polymers that were prescriptively added in the preparation of 5 g latex)}×100

(4) Degree of grafting (%): calculated by the following equation after 1 g of a graft copolymer was added to 50 g of acetone, dissolved while stirring for 24 hours, and centrifuged in a centrifugal separator at 20,000 rpm and −20° C. to separate a supernatant and a precipitate, and the precipitate was dried in a hot air dryer for 12 hours to obtain an insoluble substance.

Degree of grafting(%)=(Weight of grafted SAN copolymer)/(Total weight of first and second conjugated diene-based polymers)×100

Total weight of first and second conjugated diene-based polymers: Total weight of theoretically added first and second conjugated diene-based polymers (based on solid content)

Weight of grafted SAN copolymer: (Weight of precipitate)−(Total weight of first and second conjugated diene-based polymers)

(5) Content of coagulated solid (%): calculated as a ratio with respect to a theoretical total weight of acrylonitrile, styrene, butadiene rubber polymers, and additives (an emulsifier and the like) added during polymerization after the graft copolymer in the form of latex was filtered through a wire 100-mesh filter, and a polymer that did not pass through the wire mesh was then dried in a 100° C. hot air dryer for an hour.

Experimental Example 3

25 parts by weight of each of the graft copolymer powders according to Examples and Comparative Examples, 75 parts by weight of a SAN copolymer (92HR manufactured by LG Chem.), and 2 parts by weight of a lubricant (EBA manufactured by LG Household & Health Care Ltd.) were uniformly mixed, and the resultant mixture was put into a twin-screw extruder set at 200° C. and extruded to prepare a pellet. A physical property of the pellet thus prepared was measured by the method described below, and results thereof are shown in Table 1 and Table 2 below.

(6) Melt flow index (g/10 min): measured in accordance with ASTM D1238 at 220° C. and 10 kg.

Experimental Example 4

The pellets prepared in Experimental Example 3 were injection-molded at 200° C. to prepare specimens. Physical properties of the specimens were measured by the methods described below, and results thereof are shown in Table 1 and Table 2 below.

(7) IZOD impact strength (kg·cm/cm, ¼ In): measured in accordance with ASTM D256.

(8) Falling ball impact strength (J): measured in accordance with ASTM D3763.

(9) Glossiness (%): measured in accordance with ASTM D528 by projecting a beam of light at an angle of 45° onto the specimen using a glossmeter. In the test, higher values indicate better surface glossiness.

(10) Degradation rate of gloss retention (%): determined by measuring glossiness (45°) after the specimen was allowed to stand at 250° C. for 15 minutes and then substituting the resultant value into the following equation.

Degradation rate of gloss retention(%)=[(Initial glossiness of specimen)−(Glossiness of retained specimen)]/(Initial glossiness of specimen)×100

Experimental Example 5

The specimens prepared in Experimental Example 4 were processed to a size of 10 mm×10 mm×3 mm, washed, and etched (chromium trioxide-sulfuric acid) at 65° C. for 15 minutes, and palladium was adsorbed onto the specimens using a palladium-tin catalyst. The palladium-adsorbed specimens were subjected to plating with nickel sulfate to prepare plated specimens. Physical properties of the plated specimens were measured by the methods described below, and results thereof are shown in Table 1 and Table 2 below.

(11) Plating appearance: In the visual inspection of the overall plating condition of the plated specimen, a case in which there was a non-plated portion in the entire surface of the plated specimen or a case in which a plated portion was swollen was classified as poor plating, and the remainder was classified as good plating.

(12) Plating adhesion strength (N/m): determined by creating a crack with a width of 10 mm on the front surface of three plated specimens and measuring, using a pull gauge, the load at which about 80 mm of the coating was peeled off in the vertical direction.

Experimental Example 6

25 parts by weight of each of the graft copolymer powders according to Examples and Comparative Examples, 75 parts by weight of a SAN copolymer (92HR manufactured by LG Chem.), 2 parts by weight of a lubricant (EBA manufactured by LG Household & Health Care Ltd.), and 0.03 part by weight of a colorant (BL03-blue color manufactured by MING-ZU) were uniformly mixed, the resultant mixture was put into a twin-screw extruder set at 200° C. and extruded to prepare a pellet, and the pellet was injection-molded at 200° C. to prepare a specimen. A physical property of the pellet was measured by the method described below, and a result thereof is shown in Table 1 and Table 2 below.

(13) Colorability (%): evaluated using a measurement instrument (Hunter Lab manufactured by Hunter Associates Laboratory, Inc.) and EasyMatch QA software (version 3.7). The measurement method used in this test was AATCC Evaluation Procedure 6 "Instrumental Color Measurement".

Colorability(%)=(K/S sample)/(K/S standard)×100

K/S value=[1−0.01R]$^2$/2[0.01R]

R: Spectral reflectance

TABLE 1

| Classification | Example 1 | Example 2 | Example 3 | Example 4 | Example 5 |
|---|---|---|---|---|---|
| Divided addition of first conjugated diene-based polymer | x | x | x | x | x |
| Acetic acid added in primary enlargement (parts by weight) | 1.4 | 1.5 | 1.6 | 1.7 | 1.8 |
| Acetic acid added in secondary enlargement (parts by weight) | 0.6 | 0.5 | 0.4 | 0.3 | 0.2 |

TABLE 1-continued

| Classification | Example 1 | Example 2 | Example 3 | Example 4 | Example 5 |
|---|---|---|---|---|---|
| Weight ratio of acetic acid added in primary and secondary enlargement | 70:30 | 75:25 | 80:20 | 85:15 | 90:10 |
| (1) Average particle diameter | 0.42 | 0.40 | 0.43 | 0.40 | 0.38 |
| (2) Content of coagulated solid | 0.02 | 0.03 | 0.03 | 0.04 | 0.05 |
| (3) Polymerization conversion rate | 98.2 | 98.0 | 97.5 | 98.3 | 98.8 |
| (4) Degree of grafting | 50 | 45 | 46 | 45 | 48 |
| (5) Content of coagulated solid | 0.03 | 0.03 | 0.02 | 0.03 | 0.04 |
| (6) Melt flow index | 24 | 25 | 23 | 25 | 25 |
| (7) IZOD impact strength | 28 | 27 | 29 | 26 | 25 |
| (8) Falling ball impact strength | 50 | 52 | 54 | 51 | 50 |
| (9) Glossiness | 105 | 105 | 104 | 106 | 106 |
| (10) Degradation rate of gloss retention | 5 | 5 | 4 | 3 | 4 |
| (11) Plating appearance | Good | Good | Good | Good | Good |
| (12) Plating adhesion strength | 10.8 | 10.3 | 10.7 | 11.0 | 10.5 |
| (13) Colorability | 106 | 105 | 107 | 104 | 110 |

TABLE 2

| Classification | Comparative Example 1 | Comparative Example 2 | Comparative Example 3 | Comparative Example 4 | Comparative Example 5 | Comparative Example 6 |
|---|---|---|---|---|---|---|
| Divided addition of first conjugated diene-based polymer | x | x | x | x | x | ○ (45:55) |
| Acetic acid added in primary enlargement (parts by weight) | 2.0 | 1.2 | 1.34 | 1.38 | 1.9 | 1.34 |
| Acetic acid added in secondary enlargement (parts by weight) | — | 0.8 | 0.66 | 0.62 | 0.1 | 0.66 |
| Weight ratio of acetic acid added in primary and secondary enlargement | — | 60:40 | 67:33 | 69:31 | 95:5 | 67:33 |
| (1) Average particle diameter | 0.35 | 0.29 | 0.31 | 0.32 | 0.32 | 0.38 |
| (2) Content of coagulated solid | 1.23 | 0.12 | 0.19 | 0.25 | 0.85 | 1.2 |
| (3) Polymerization conversion rate | 97.2 | 97.5 | 96.5 | 97.0 | 97.0 | 96.8 |
| (4) Degree of grafting | 47 | 35 | 37 | 33 | 30 | 38 |
| (5) Content of coagulated solid | 0.82 | 1.0 | 0.08 | 0.06 | 0.85 | 0.35 |
| (6) Melt flow index | 23 | 21 | 20 | 21 | 20 | 18 |
| (7) IZOD impact strength | 19 | 20 | 19 | 21 | 22 | 17 |
| (8) Falling ball impact strength | 42 | 25 | 30 | 34 | 28 | 36 |
| (9) Glossiness | 105 | 95 | 100 | 101 | 96 | 102 |
| (10) Degradation rate of gloss retention | 7 | 10 | 5 | 7 | 10 | 15 |
| (11) Plating appearance | Good | Poor | Poor | Poor | Poor | Poor |

TABLE 2-continued

| Classification | Comparative Example 1 | Comparative Example 2 | Comparative Example 3 | Comparative Example 4 | Comparative Example 5 | Comparative Example 6 |
|---|---|---|---|---|---|---|
| (12) Plating adhesion strength | 6.5 | 5.5 | 5.0 | 4.5 | 4.5 | 3.5 |
| (13) Colorability | 105 | 99 | 98 | 101 | 98 | 100 |

Referring to Table 1 and Table 2, it can be seen that the average particle diameters of second conjugated diene-based polymers of Examples 1 to 5 were equivalent to or higher than those of second conjugated diene-based polymers of Comparative Examples 1 to 6, whereas the contents of coagulated solid were significantly low, confirming significantly better latex stability. In addition, it can be seen that the polymerization conversion rates of graft copolymers of Examples 1 to 5 were equivalent to or higher than those of graft copolymers of Comparative Examples 1 to 6, whereas the contents of coagulated solid were significantly low, confirming significantly better latex stability. Additionally, it can be seen that the melt flow indices of pellets of Examples 1 to 5 were higher than those of pellets of Comparative Examples 1 to 6, confirming better processability. In addition, the specimens of Examples 1 to 5 exhibited high IZOD impact strength, high glossiness, an excellent plating appearance, high plating adhesion strength, high colorability, and a low degradation rate of gloss retention. Meanwhile, the specimen of Comparative Example 1, in which multi-stage enlargement was not performed, exhibited low IZOD impact strength, low falling ball impact strength, a high degradation rate of gloss retention, and low plating adhesion strength compared to those of the specimens of Examples 1 to 5.

The specimen of Comparative Example 2, in which a weight ratio of acids added in the primary and secondary enlargement stages was 60:40, exhibited low IZOD impact strength, low falling ball impact strength, low glossiness, a high degradation rate of gloss retention, a poor plating appearance, low plating adhesion strength, and low colorability compared to those of Examples 1 to 5.

The specimen of Comparative Example 3, in which a weight ratio of acids added in the primary and secondary enlargement stages was 67:33, exhibited low IZOD impact strength, low falling ball impact strength, low glossiness, a poor plating appearance, low plating adhesion strength, and low colorability compared to those of Examples 1 to 5.

The specimen of Comparative Example 4, in which a weight ratio of acids added in the primary and secondary enlargement stages was 69:31, exhibited low IZOD impact strength, low falling ball impact strength, low glossiness, a high degradation rate of gloss retention, a poor plating appearance, low plating adhesion strength, and low colorability compared to those of Examples 1 to 5.

The specimen of Comparative Example 5, in which a weight ratio of acids added in the primary and secondary enlargement stages was 95:5, exhibited low IZOD impact strength, low falling ball impact strength, low glossiness, a high degradation rate of gloss retention, a poor plating appearance, low plating adhesion strength, and low colorability compared to those of Examples 1 to 5.

The specimen of Comparative Example 6, in which a weight ratio of acids added in the primary and secondary enlargement stages was 67:33 and a first conjugated diene-based polymer was dividedly added, exhibited low IZOD impact strength, low falling ball impact strength, low glossiness, a high degradation rate of gloss retention, a poor plating appearance, and low plating adhesion strength compared to those of Examples 1 to 5. Also, it can be seen that, although the second conjugated diene-based polymer of Comparative Example 6 had the same average particle diameter as that of Example 5, the specimen of Comparative Example 6 exhibited significantly degraded IZOD impact strength compared to the specimen of Example 5.

Therefore, it can be confirmed from these results that the weight ratio of acids added in the primary and secondary enlargement stages of a conjugated diene-based polymer has a great effect on the overall physical properties of a thermoplastic resin molded article.

The invention claimed is:

1. A method for preparing a conjugated diene-based polymer, comprising:
    enlarging a first conjugated diene-based polymer in multiple stages to prepare a second conjugated diene-based polymer,
    wherein the multi-stage enlargement includes a primary enlargement stage and a secondary enlargement stage, and
    a weight ratio of acids added in the primary enlargement stage and the secondary enlargement stage is 70:30 to 90:10.

2. The method of claim 1, wherein the acids added in the primary enlargement stage and the secondary enlargement stage are in a state of a solution in which the acids are mixed with a solvent.

3. The method of claim 1, wherein, after the primary enlargement stage, stirring is further included.

4. The method of claim 1, wherein the first conjugated diene-based polymer has an average particle diameter of 0.05 to 0.15 µm.

5. The method of claim 1, wherein the second conjugated diene-based polymer has an average particle diameter of 0.35 to 0.5 µm.

6. The method of claim 1, wherein, after the secondary enlargement stage, stabilizing the second conjugated diene-based polymer by adding an emulsifier and a basic substance is further included.

7. A method for preparing a graft copolymer, comprising:
    enlarging a first conjugated diene-based polymer in multiple stages to prepare a second conjugated diene-based polymer; and
    adding the second conjugated diene-based polymer, an aromatic vinyl-based monomer, and a vinyl cyan-based monomer to a reactor and performing polymerization,
    wherein the multi-stage enlargement includes a primary enlargement stage and a secondary enlargement stage, and
    a weight ratio of acids added in the primary enlargement stage and the secondary enlargement stage is 70:30 to 90:10.

8. The method of claim 7, further comprising further adding the first conjugated diene-based polymer to the reactor and performing polymerization.

9. The method of claim 8, wherein the first and second conjugated diene-based polymers are added in a weight ratio of 10:90 to 40:60.

10. The method of claim 7, wherein the polymerization is emulsion polymerization.

* * * * *